Figure 1:
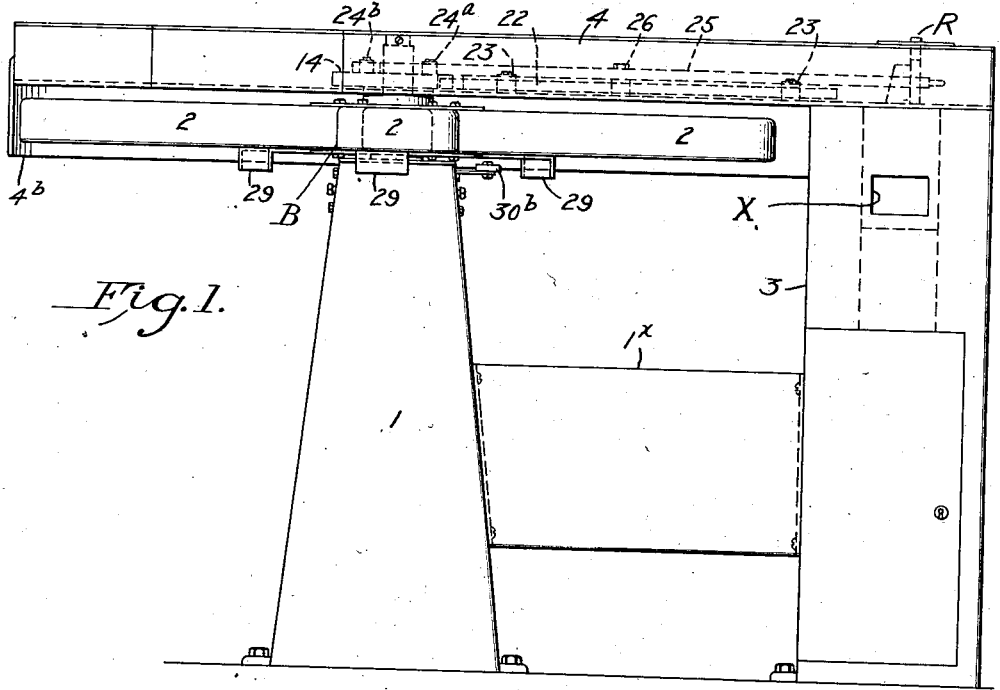

March 31, 1936.  H. A. NAU  2,035,615

TURNSTILE

Filed Nov. 29, 1930   4 Sheets-Sheet 1

Inventor
Henry A. Nau
By Attorneys
Nathan & Bowman

March 31, 1936.　　　　　H. A. NAU　　　　　2,035,615
TURNSTILE
Filed Nov. 29, 1930　　　4 Sheets-Sheet 2

Inventor
Henry A. Nau
By Attorneys Nathan & Bowman

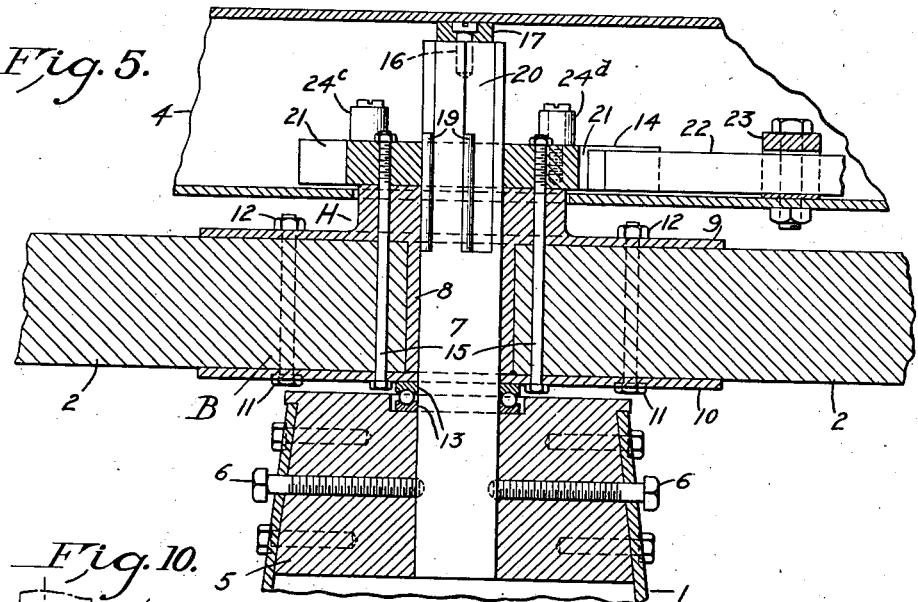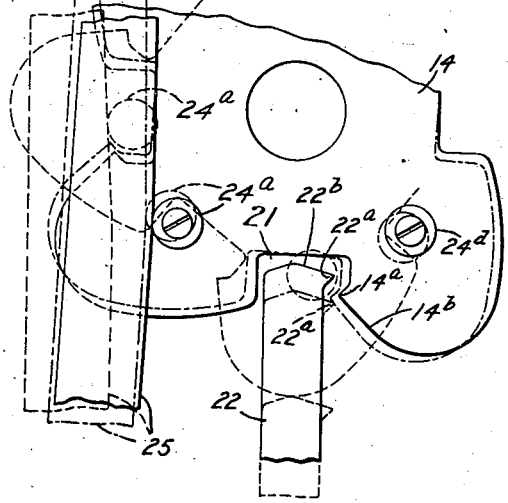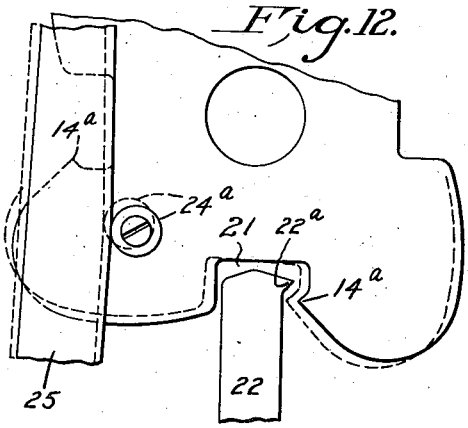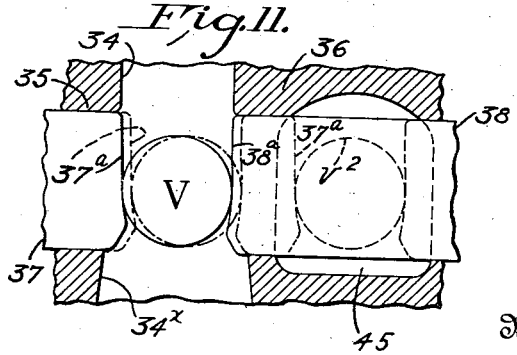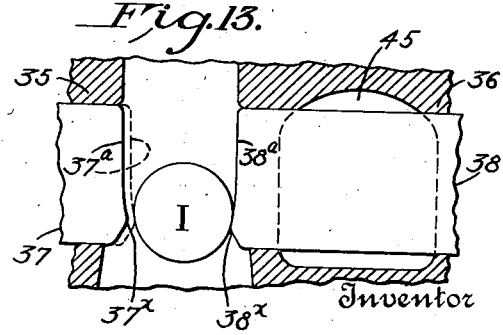

March 31, 1936.  H. A. NAU  2,035,615
TURNSTILE
Filed Nov. 29, 1930  4 Sheets-Sheet 4
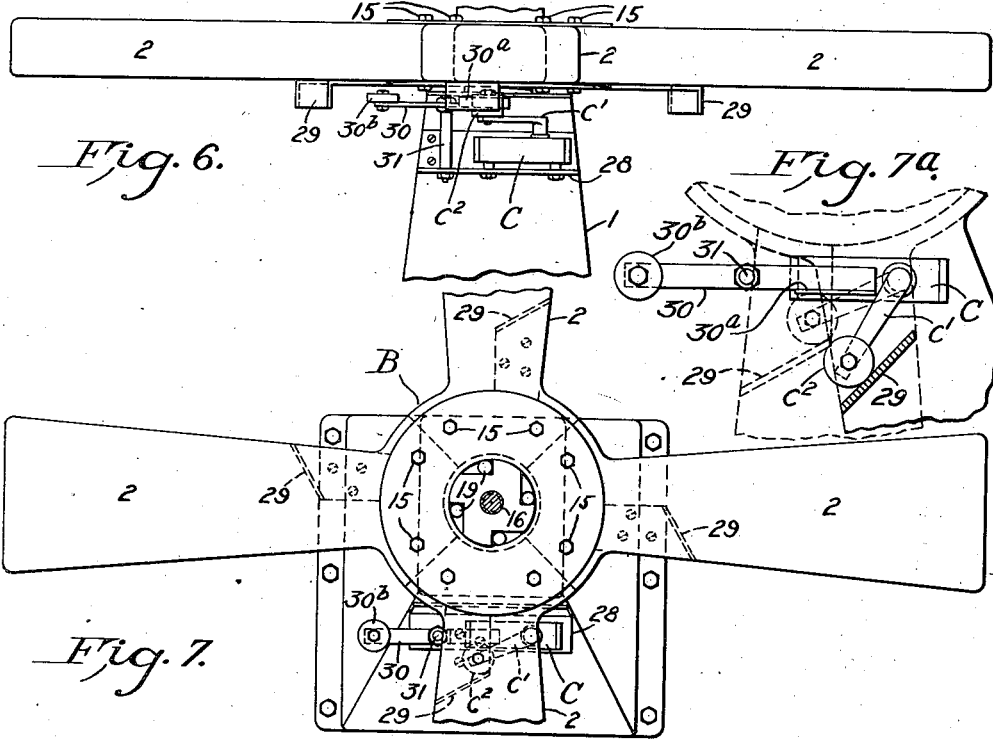
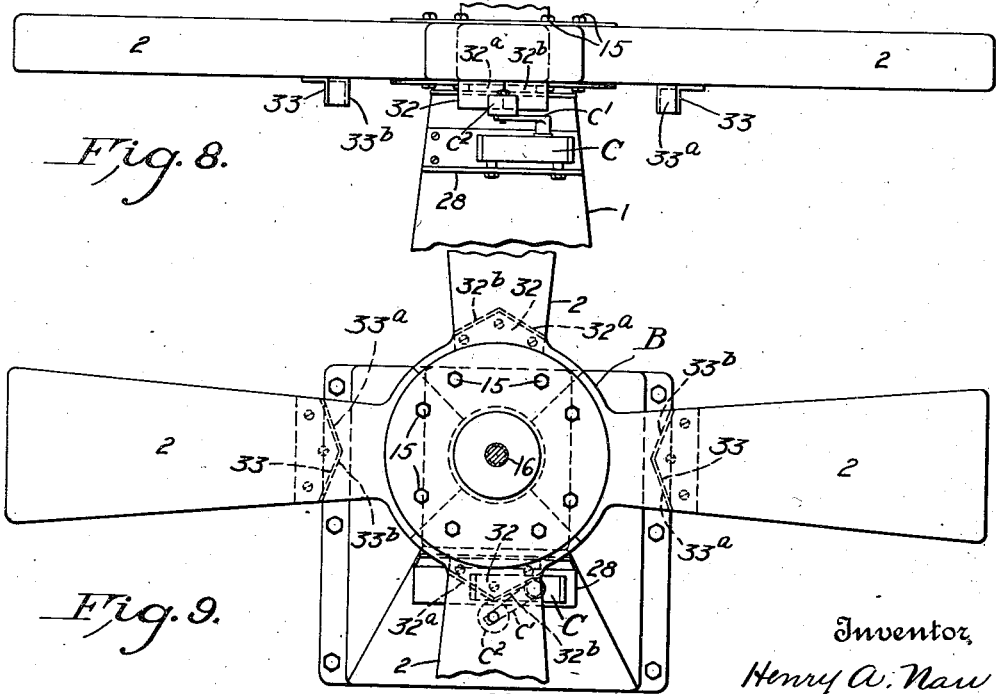
Inventor
Henry A. Nau
By Attorneys
Nathan & Bowman Patented Mar. 31, 1936

2,035,615

UNITED STATES PATENT OFFICE 2,035,615

TURNSTILE

Henry A. Nau, New York, N. Y.

Application November 29, 1930, Serial No. 499,043

10 Claims. (Cl. 39—3)

This invention relates to coin-controlled turnstiles of the all-mechanical type and it has for an object to provide an improved turnstile of that type which will overcome certain undesirable features of prior constructions, which will eliminate inherent defects thereof and which, in general, will render available a turnstile which is stronger, smoother in action and less noisy than any heretofore provided.

One of the chief objections to coin-controlled turnstiles, as heretofore constructed, is that they have produced excessive noise and vibration when operated, due primarily to actuation of the mechanism for unlocking and locking the rotatable arms and for arresting the movement thereof after each operation. Various forms of cushioning devices heretofore have been suggested but, insofar as applicant is aware, none of these devices has proven entirely satisfactory. Turnstiles, when installed in such places as subway entrances, etc., are subjected to much abuse by rushing crowds which include people of all types and temperaments. Few, if any, devices are required to operate continuously under such adverse conditions.

An object of this invention is to provide an all-mechanical coin-controlled turnstile which will effectively withstand this abuse, which will operate smoothly, quietly and without vibration and in which the arms will, after each operation, quickly and positively move to their home position, i. e. to the position in which they obstruct passage and which will prevent the patrons from being bumped in the rear by the oncoming arms. This object has been attained by combining in a turnstile an improved support for the arms, and improved control means therefor and a combined hydraulic silencer and shock absorber adapted upon each actuation of the stile, to overcome the momentum thereof near the latter part of its movement, and to eliminate all sound and vibration of parts as they are brought into their home position.

Another objection to existing turnstiles is due to the fact that although various devices have been proposed to prevent operation of the stiles by coins or tokens of a size smaller than those for which the machines were designed, nevertheless by certain manipulation of the stiles it has been possible to operate them with coins of smaller size, such, for example, as by a penny in a machine designed to be actuated by nickels only.

A further object of this invention is to provide means whereby operation of the stile will be positively prevented by the use of coins of the size next smaller than that for which the machine is designed, while affording sufficient latitude to permit the use of either full size or worn coins of a given denomination. This object has been attained, as hereinafter will be more fully explained.

Another object is to provide a coin-controlled unlocking device of that type in which the coin constitutes a part of the unlocking mechanism, to provide means, automatically actuated at a predetermined point in the operation of the device, to release the coin and to provide means cooperating therewith positively to eject the coin from said mechanism. This object also has been attained as hereinafter will appear.

Another feature of this invention is the provision of a hydraulically controlled turnstile capable of being actuated either as a one-way or a two-way device, in other words, a turnstile capable of operating in either or both of two directions.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
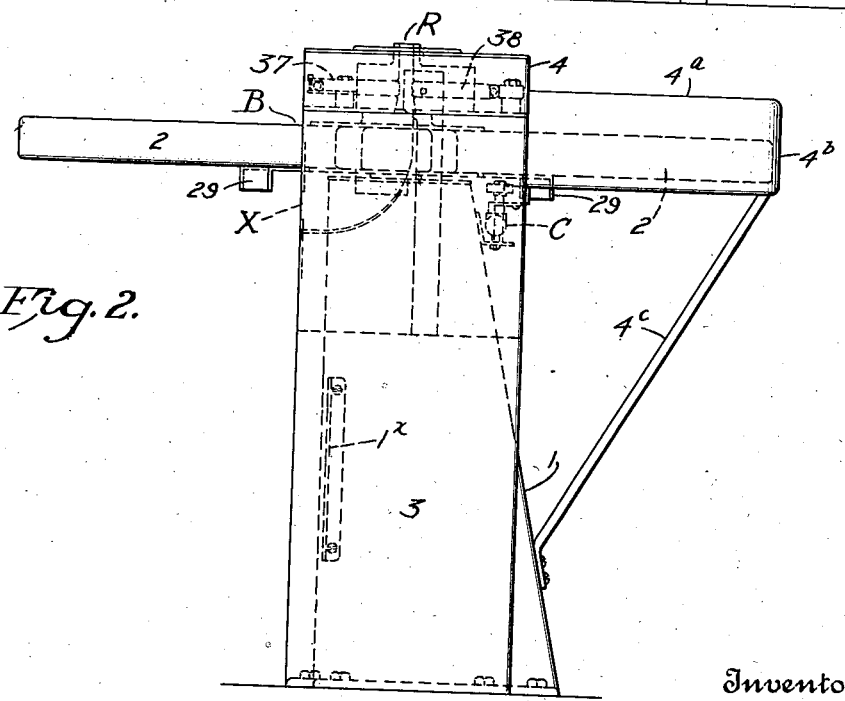
Figure 3:
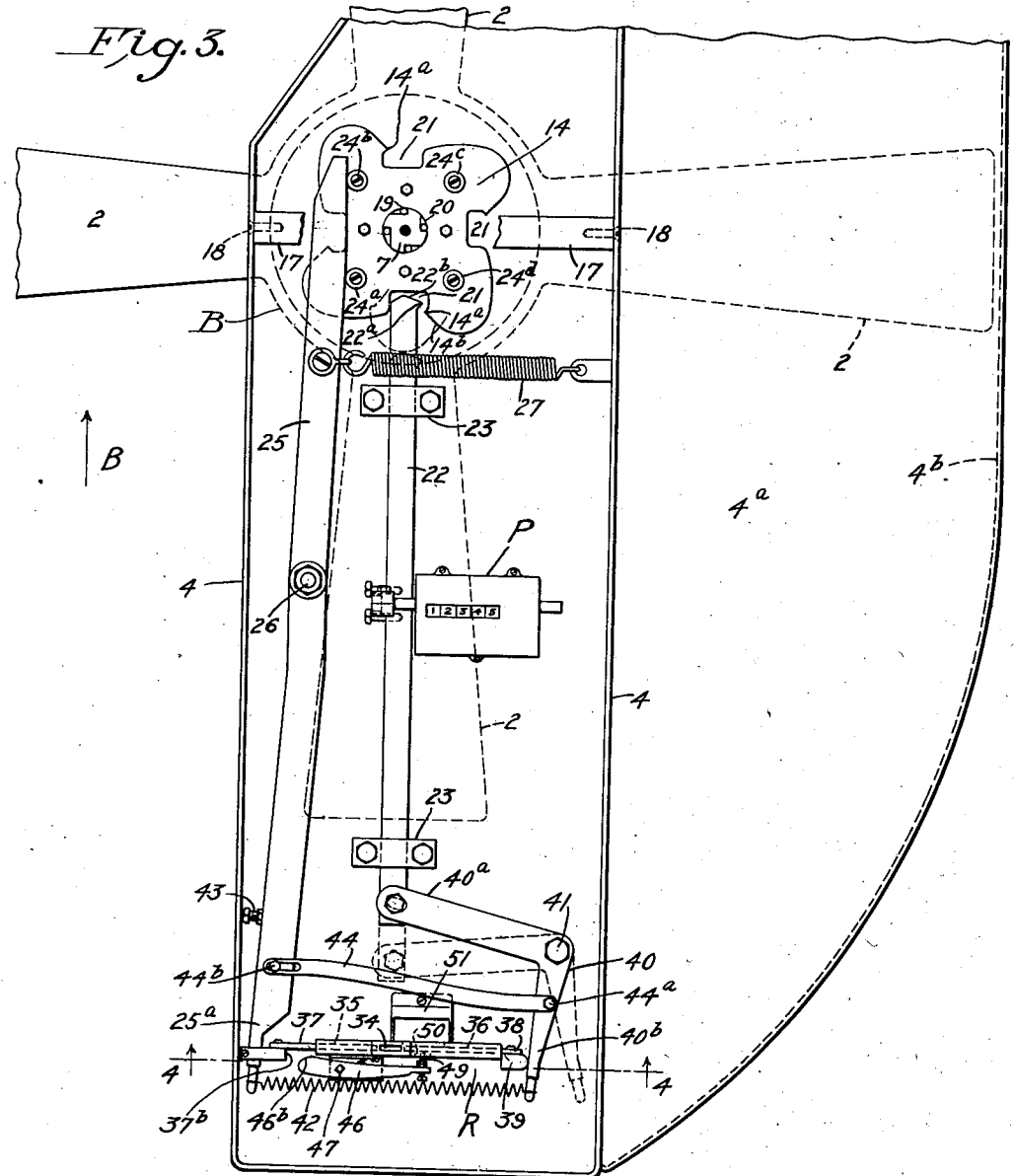
Figure 4:
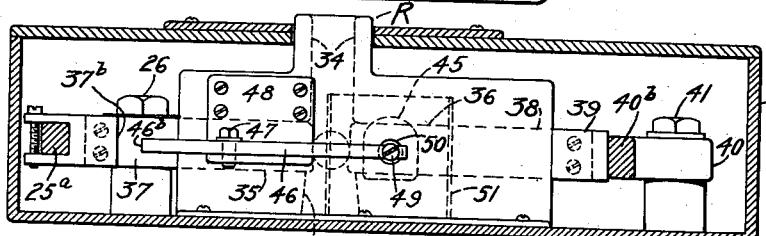

Figure 1 is a side elevation of a turnstile embodying the present invention. Fig. 2 is a right end view of Fig. 1. Fig. 3 is an enlarged plan view of a portion of the improved turnstile, with the cover removed, showing more particularly the locking mechanism. Fig. 4 is an enlarged section substantially on the line 4—4 of Fig. 3. Fig. 5 is a vertical sectional view through the upper end of the supporting pedestal and the means for rotatably supporting the arms thereon. Fig. 6 is a side view, looking in the direction opposite to that of Fig. 1, showing the upper end of the pedestal and the rotatable arms mounted thereon and showing also an hydraulic silencer and shock absorber as applied to a one way machine. Fig. 7 is a plan of Fig. 6. Fig. 7ᵃ is an enlarged detail, in plan showing the means for actuating and resetting the silencer and shock absorber. Fig. 8 is a view similar to Fig. 6 showing a two-way machine. Fig. 9 is a plan of Fig. 8. Fig. 10 is a detail plan of the locking cam and bar parts associated therewith, showing in broken lines various positions assumed during operation. Fig. 11 is a detail view of the coin slides showing, in broken lines, positions corresponding to the positions illustrated in Fig. 10, Figs. 10 and 11 illustrating the operation of the unlocking means when using a coin of the size for which the machine is designed. Figs. 12 and 13 are views similar to Figs. 10 and 11 showing the position of the parts when attempting to operate the machine by a coin of smaller size.

Referring more specifically to the drawings this invention is disclosed as embodied in a turnstile comprising a pedestal or standard 1 which supports, at its upper end, the intermittently rotatable barrier B comprising a hub H and radial arms 2 fixed therein. Located forwardly of the barrier is an upright column 3 which serves as a support for one end of a horizontally disposed housing 4 within which is arranged the barrier-locking mechanism, later to be described. The column 3 also serves as a collecting receptacle for coins utilized to operate the turnstile. The standard 1, and column 3 are connected together by a plate $1^x$ which serves as a combined barrier and brace.

The barrier B is rotatably supported upon the column 1 as best shown in Fig. 5. Within the upper end of the column there is secured a bearing block 5 into which is fixed, as by screws 6, one end of a vertically disposed shaft 7 upon which the hub H of the barrier is rotatably journaled. The hub comprises a sleeve 8 formed integral with a flange 9, which overlies and engages the arms, and a disk which underlies the arms. Bolts 11, passed through the disk 10, arms 2 and flange 9, have nuts 12 threaded thereon whereby the arms and the elemnts of the hub are all securely held together to turn as a unit on the shaft 7 An anti-friction bearing 13 intermediate the disk 10 and the block 5 serves to transmit to the latter the weight of the barrier and parts carried thereby and to maintain the barrier freely rotatable. Upon the hub H, within the housing 4, there is secured a locking cam plate 14 later to be referred to Bolts 15 passing through the cam plate 14, arms 2 and disk 10 serve to secure the cam to the hub and assist in holding the arms and hub together. To the upper end of the shaft is secured, as by screw 16, a cross bar 17 the ends of which are secured to the housing 4 by screws 18, as shown in Fig. 3. This serves to support the housing 4 on the shaft 7 and to hold the housing against lateral movement.

When it is desired to use the device as a one-way machine, suitable means may be provided to prevent retrograde movement of the barrier. In Figs. 3, 5 and 7 this means is illustrated as a one-way clutch mechanism of conventional form comprising rollers 19 fitted into tapered notches 20 formed in the periphery of the shaft 7. As is well understood, rotation of the barrier in one direction, i. e., clockwise as seen in Figs. 3 and 7, will cause the rollers to move into the notches where they do not obstruct rotation of the barrier. An attempt to rotate the barrier in the opposite direction will cause the rollers to be moved outwardly in the notches thereby causing them to bind between the longitudinal wall of the notches and the wall of the cylindrical bore in the cam 14 and sleeve 8 through which the shaft 7 passes, thereby locking the barrier against rotation.

The cam plate 14 is formed with a plurality of notches 21 adapted to receive one end $22^a$ of a locking bar 22 slidingly mounted in bearing blocks 23 secured upon the floor of the housing 4. The end $22^a$ of the bar 22 is normally maintained in one of the notches 21 as shown in full lines in Fig. 3 and may be withdrawn therefrom, to permit rotation of the barrier, only after the insertion of a proper coin, token or check into an unlocking mechanism, later to be described.

Means is provided for insuring that the barrier will be brought to one of its home positions, i. e., a position in which one of the arms 2 obstructs passage through the usual aisle or passageway indicated by the arrow B in Fig. 3 after each operation of the stile. This means consists of rollers $24^a$, $24^b$, $24^c$, $24^d$ carried by the cam plate 14 and adapted, upon rotation of the barrier, successively to engage one end of a lever 25 fulcrumed at 26 within the housing 4. A coil spring 27, connected at one end to the lever 25 and at the other end to the housing 4, tends to maintain the lever in the position shown in Fig. 3. During the first 45° movement from this position the roller $24^a$ will force the lever 25 outwardly in opposition to the spring 27. After this half-way position has been passed the lever, under the influence of the spring, reacts upon the roller $24^a$ and causes further rotation of the cam and the barrier until a full 90° movement has been effected and the roller $24^a$ has assumed the position now occupied by the roller $24^b$. Thus quarter rotations of the barrier are successively effected, after each of which the barrier is brought to rest with one of the arms perpendicular to the passageway, as shown in Fig. 3. A register P, mounted in the housing 4 and actuated by reciprocation of the locking bar 22 automatically records the number of operations of the barrier.

At the side of the turnstile, remote from the passageway B, the housing 4 is formed with a horizontal extension $4^a$ terminating in a downwardly projecting flange or apron $4^b$ which together form a guard for the arms 2. This guard also serves to define one side of the passageway B when a plurality of the turnstiles are set up in a row, thereby dispensing with, all rails, chains, etc., heretofore required. A brace $4^c$ connecting the lower portion of the standard 1 with the outermost portion of the extension $4^a$ serves to support the latter and constitutes a barrier to prevent so-called "ducking under".

One of the important features of this invention consists in the provision of a combined silencer and shock absorber for arresting the rotation of the barrier, after each quarter turn thereof, without noise and without vibration. This has been accomplished by combining with the turnstile an hydraulic shock absorber adapted upon each operation of the barrier, and during the last portion of its movement, to overcome the momentum thereof and quietly to bring it to rest in one of its home positions.

Figs. 6, 7 and $7^a$ show a device of this nature embodied in a one-way turnstile. In this embodiment, an hydraulic shock absorber C, of conventional form, is secured upon a bracket 28 fixed upon the standard 1 and has an arm $c^1$ carrying a roller $c^2$ adapted upon each actuation of the barrier, and during the last portion of its movement, to be engaged by a cam plate 29, one of which is carried by each of the arms 2. During the final movement of the barrier under its momentum and the influence of the spring 27 the cam plate 29 shifts the arm $c^1$ from the position shown, in full lines in Fig. 7ª to the position shown in dotted lines. This swinging of the lever $c^2$ against the yielding resistance offered by the fluid in the shock absorber, as will be well understood, overcomes the momentum of the barrier and permits it to assume its home position without shock, vibration or noise.

Any suitable means may be provided for returning the arm $c^1$ to its full line position for subsequent engagement of the roller $c^2$ with the next cam plate 29. In Figs. 6, 7 and 7ª this is shown as accomplished by a lever 30 fulcrumed intermediate its ends on a stud 31 supported by the bracket 28. One end of the lever 30 is formed with an upturned flange 30ª adapted to engage the roller $c^2$ and the other end of the lever carries a roller 30ᵇ adapted to be engaged by the cam plates 29 as each of the arms 2 is moved out of its home position adjacent the shock absorber. Contact of the cams 29 with the roller 30ᵇ will cause the lever 30 to be turned clockwise, as viewed in Fig. 7ª whereupon the flange 30ª will force the roller $c^2$ and arm $c^1$ of the shock absorber from the dotted line position in Fig. 7ª to their full line position.

This invention also contemplates the use of a double acting shock absorber whereby the means to return the lever $c^1$ to its initial position may be dispensed with. A construction of this nature is illustrated in Figs. 8 and 9 in combination with a two-way turnstile but it is to be understood that this construction is also adaptable to one-way stiles. In this construction the roller $c^2$ is, during unidirectional rotation of the barrier, alternately forced inwardly and outwardly by oppositely inclined cams carried by the arms 2. As shown in Fig. 9 one pair of diametrically opposed arms carry cams 32 adapted to force the roller outwardly and the other pair of arms carry cams 33 adapted to force it inwardly. Thus during continued rotation of the barrier, the roller $c^2$ and the arm $c^1$ is alternately swung in opposite directions. Inasmuch as the construction shown in Fig. 9 is adapted for two-way rotation the cams are made double so that the arm $c^1$ will be given its intended movement regardless of the direction of rotation of the barrier. During clockwise rotation of the barrier the faces 32ª and 33ª of the cams 32 and 33 will alternately engage and shift the roller $c^2$. When the barrier is rotated in the opposite directions the faces 32ᵇ and 33ᵇ alternately will shift the roller.

The coin controlled means for unlocking the barrier will now be described. At the forward or entrance end of the turnstile the housing 4 is provided with a coin receiver R provided with a coin slot 34 arranged transverse to the housing. Arranged to slide horizontally in guideways 35 and 36, formed in the coin receiver R, are coin-bars 37 and 38 whose adjacent ends 37ª and 38ª are normally maintained beneath and in line with the coin slot 34 and are so formed and spaced apart as to retain between them, as shown in full lines in Fig. 11, a coin or token of the proper diameter which has been dropped into the coin slot 34. Should a coin of smaller diameter be inserted in the coin slot it will pass freely through the space between the adjacent ends of the coin-bars, through the slot 34ˣ therebeneath and thence into the coin return box X in the side of the column 3.

The coin-bar 37 is connected with the forward end 25ª of the lever 25 previously referred to. The end of the coin-bar 38, remote from the coin slot, has secured to it an abutment block 39 adapted to engage the end of the coin receptacle thereby to limit the inward movement of the bar. This bar is normally forced inwardly to the positions shown in Figs. 3 and 4 by the action of a bell-crank lever 40 fulcrumed at 41 to the housing 4. One arm 40ª of the bell-crank lever is connected with the locking bar 22 and the other arm 40ᵇ thereof bears normally against the block 39. A coil spring 42 interposed between the end 25ª of the lever 25 and the arm 40ᵇ of the bell-crank lever normally tends to turn the bell-crank lever from its dotted line position in Fig. 3 to its full line position, thereby tending to force the locking bar toward the cam 14 and to hold the coin-bar 38 in the position shown in Figs. 3 and 4. An adjusting screw 43 threaded into the lever 25 and adapted to engage the side wall of the housing 4 serves to limit the swinging movement of the lever 25 in one direction and thereby to determine the retracted position of the coin bar 37. By adjusting the screw 43 the space between the adjacent ends of the coin bars may be varied.

To insure against the barrier remaining open (that is freely rotatable without the insertion of the proper coin) should the spring 42 break or due to sticking of the parts fail to force the end of the locking bar into the notch 21 in the cam 14 each time the barrier reaches a home position, auxiliary means is provided for actuating the locking bar 22. This consists of a link 44 having one end pivoted at 44ª to the bell-crank lever 40 and its other end connected by a pin-and-slot connection 44ᵇ, with the lever 25. The pin-and-slot connection, under normal operation, permits the bell-crank lever to move independently of the lever 25 for purposes hereinafter to be explained, but acts, in case of emergency, to pull the link 44 and thereby swing the lever 40 and slide the locking bar to its locking position.

*Operation*

The operation of the improved turnstile is as follows: A patron approaches the turnstile and deposits a coin or token V of predetermined diameter in the coin receptacle. The coin passes downwardly in the coin slot and is held suspended therebeneath by its engagement with the adjacent ends of the coin-bars. Then, passing through the passageway B, the patron engages the barrier arm extending across said passageway and initiates rotation of the barrier. The first angular movement of the barrier, and the cam plate 14 carried thereby, causes one of the rollers (in Fig. 3 the roller 24ª) carried by the cam plate to swing the lever 25 counter-clockwise from the position shown in full lines in Fig. 10 to the position shown in dot-dash lines. This initial movement causes the end 25ª of the lever to push the coin-bar 37 to the right to the position shown in dot-dash lines in Fig. 11. This movement of the coin-bar 37 effects, through the coin V, coin-bar 38 and bell-crank lever 40 retraction of the locking bar 22 from the position shown in full lines Fig. 10 to that shown in dot-dash lines. It will be noticed that in this position a tooth 22ª formed on the locking bar has passed beyond the point of a similar tooth 14ª, one of which is formed on the cam plate adjacent each of the locking notches 21. Further rotation of the barrier causes the roller to swing the lever 25 further in a counter-clockwise direction which in turn slides the coin bar 37 to the right toward the position indicated in dotted lines in Fig. 11. During this further movement of the coin-bar 37 the coin V shifts the coin-bar 38 to the right and places the coin V in the position $v^2$ shown in dotted lines in Fig. 11, from which position it is permitted to fall through an opening 45, into a container in the column 3.

The cam plate 14 is formed, adjacent each of the locking notches 21, with a cam surface 14$^b$ which, during rotation of the barrier, engages the end 22$^b$ of the locking bar 22 and acts to shift the bar and swing the lever 40 slightly faster than those elements normally would be moved by the action of the coin-bar 38. This causes the arm 40$^b$ to be moved out of contact with the block 39 on the coin-bar 38 whereby backward pressure of the bar on the coin is relieved, thereby permitting the coin freely to fall from between the coin-bars 37 and 38.

To insure that the coin will be removed from between the coin-bars, even though the coin should be sticky, this invention purposes a coin ejector which will positively eject the coin. This consists of a lever 46, fulcrumed at 47 on a bracket 48 secured to the coin receptacle. One end of the lever carries a pin 49 adapted to be projected through an aperture 50 in the wall of the coin receptacle adjacent the coin opening 45, thereby to eject the coin from between the ends of the coin-bars should it inadvertently fail to fall therefrom.

Swinging movement is given to the lever 46 at each reciprocation of the coin-bar 37 by the engagement of a shoulder 37$^b$ with a cam shaped end 46$^b$ of the lever. A suitable spring serves to swing the lever in the opposite direction, thereby to withdraw the ejector pin, when the shoulder 37$^b$ moves out of engagement with the lever. To insure that the ejected coin will pass downwardly through the coin passage and into the coin container, a sheet metal hood 51 is secured upon the floor of the housing 4 adjacent the opening 45 in the coin receptacle.

As hereinbefore stated, one of the objections to coin controlled turnstiles, as previously constructed, is that it has been possible to operate them by a coin of a size smaller than that for which the machine was designed. This heretofore has been possible by first turning the barrier as far as the play in parts will permit before inserting an undersize coin. This initial movement of the parts has been enough to close the coin gap sufficiently to cause the walls of the coin-bars to retain an undersize coin. Then, by manipulation of the barrier, the coin could be shifted to a point between the coin-bars in which pressure on the barrier would withdraw the barrier lock and permit rotation thereof.

The present invention provides means whereby operation of the device by an undersize coin is precluded. This has been effected by so forming and proportioning the parts that, in the absence of a proper coin, initial rotation of the barrier such as would take up the gap between the coin-bars to such an extent that they would retain between them an undersize coin, takes up substantially all of the play between the side wall of the locking notch and the adjacent wall of the locking element. Therefore with an undersize coin between the coin-bars there is not sufficient angular movement of the cam plate 14 available to cause, through the lever 25 coin-bars etc., withdrawal of the end of the locking element 22 from the locking notch 21.

If desired, this locking of the device against actuation by an undersize coin may be made even more positive by providing the locking bar and the cam plate 14 with interlocking teeth 22$^a$ and 14$^a$ respectively as shown in Figs. 12 and 13. When the barrier has been given an initial angular movement, such as would move the coin-bar 37 toward the bar 38 sufficiently to retain between their high points 37$^x$ and 38$^x$ respectively, an undersize coin I as indicated in Fig. 13, the tooth 14$^a$ lies within the path of movement of the tooth 22$^a$ thereby precluding retraction of the end of the locking bar from the locking notch 21 in the cam plate and preventing further rotation of the barrier.

From the foregoing it will be perceived that this invention provides an improved turnstile which will operate smoothly, quietly and without vibration and which may not be operated by a coin of a diameter materially less than that for which the machine is designed.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention, and therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. A turnstile combining a standard; an armed barrier rotatably mounted thereon; an hydraulic shock absorber supported by said standard and provided with an actuating arm; and a cam carried by each arm of said barrier and adapted upon predetermined angular movements of said barrier successively to engage and shift said actuating arm, thereby to cause said shock absorber to overcome the momentum of said barrier.

2. A one-way turnstile combining a standard; an armed barrier rotatably mounted thereon; means to prevent rotation of said barrier in one direction; an hydraulic shock absorber supported by said standard and provided with an actuating arm; a cam carried by each arm of said barrier and adapted successively to shift said actuating arm from an initial position as said barrier approaches its home positions thereby to cause said shock absorber to overcome the momentum of said barrier; and means active during the rotation of said barrier to return said actuating arm to its initial position.

3. A one-way turnstile combining a support; an armed barrier rotatably mounted thereon; means to prevent rotation of said barrier in one direction; an hydraulic shock absorber, mounted on said support and provided with an actuating arm; a cam carried by each arm of said barrier and adapted successively to shift said actuating arm from an initial position as said barrier approaches its home positions thereby to cause said shock absorber to overcome the momentum of said barrier; and a lever fulcrumed adjacent said shock absorber and having one end adapted to engage said actuating arm the opposite end of said lever being arranged in the path of said cams and adapted to be shifted thereby, during rotation of the barrier, to cause said lever to return the actuating arm to its initial position.

4. A two-way turnstile combining a support an armed barrier rotatably mounted thereon; an hydraulic shock absorber mounted on said support and provided with an actuating arm; and a double faced cam carried by each arm of said barrier, and adapted to shift said actuating arm to cause said shock absorber to overcome the momentum of said barrier, one of the faces of each cam being adapted to actuate said actuating arm when the barrier is rotated in one direction and the other face being adapted to actuate the arm when the barrier is rotated in the opposite direction, alternate ones of said cams being arranged to shift said actuating arm in first one direction and then in the opposite direction.

5. A turnstile combining a support; an armed barrier rotatably mounted thereon; a double acting hydraulic shock absorber mounted on said support and a cam carried by each arm of said barrier and adapted during rotation of said barrier alternately to engage a portion of said shock absorber to cause said shock absorber to overcome the momentum of said barrier, alternate ones of said cams being arranged to shift said portion of the shock absorber first in one direction and then in the opposite direction.

6. A turnstile combining a standard; an armed barrier member rotatably mounted thereon; an hydraulic shock absorber supported by said standard and provided with an actuating member; and an inclined cam means and cam engaging means one of said means being mounted on said barrier member, and the other on said shock absorber actuating member and being adapted to engage at points corresponding to predetermined angular positions of said rotatable barrier whereby said inclined cam means serves to shift progressively said actuating member against the hydraulic resistance of said shock absorber and the momentum of said barrier member is gradually overcome.

7. A turnstile combining a standard; an armed barrier member rotatably mounted thereon; an hydraulic shock absorber supported by said standard and provided with an actuating member; and a series of inclined cams mounted to advance successively in accordance with the rotation of said barrier member into engagement with said shock absorber actuating member said inclined cams serving to shift progressively said shock absorber actuating member against the hydraulic resistance and to overcome gradually the momentum of said barrier at predetermined angular positions thereof.

8. A turnstile combining a standard; an armed barrier member rotatably mounted thereon; an hydraulic shock absorber supported by said standard and provided with an actuating member; and cooperating inclined cam means and roller cam engaging means one of said means being connected to said shock absorber actuating member, and the other cooperating means being connected to said barrier member and adapted to revolve through angular movements corresponding to the angular movements of said armed barrier, said roller means and inclined cam means thereby engaging intermittently and the resistance of said hydraulic shock absorber serving to overcome gradually the momentum of said barrier member at predetermined angular positions thereof.

9. A turnstile combining a support; an armed barrier rotatably mounted thereon; an hydraulic shock absorber mounted on said support and provided with an actuating member; a double faced cam carried by each arm of said barrier, and adapted to shift progressively said shock absorber actuating member as the armed barrier approaches predetermined angular positions whereby the momentum of the armed barrier is overcome, one face of each cam being effective in one direction of rotation of the barrier, and the other face respectively being effective in the opposite direction of rotation.

10. A turnstile combining a support; an armed barrier rotatably mounted thereon; an hydraulic shock absorber mounted on said support and provided with an actuating member; an inclined cam carried by each arm of said barrier and adapted successively to shift said actuating member from an initial position against the hydraulic resistance of said shock absorber as said barrier approaches its home positions thereby to overcome the momentum of said barrier; and means to return said actuating member to its initial position.

HENRY A. NAU.